United States Patent
Jentzsch

(10) Patent No.: US 10,583,891 B2
(45) Date of Patent: Mar. 10, 2020

(54) CLIPLESS PEDAL SYSTEM

(71) Applicant: Kevin Reed Jentzsch, Woodland Hills, UT (US)

(72) Inventor: Kevin Reed Jentzsch, Woodland Hills, UT (US)

( * ) Notice: Subject to any disclaimer, the term of this patent is extended or adjusted under 35 U.S.C. 154(b) by 0 days.

(21) Appl. No.: 16/197,979

(22) Filed: Nov. 21, 2018

(65) Prior Publication Data

US 2019/0152559 A1    May 23, 2019

Related U.S. Application Data

(60) Provisional application No. 62/589,835, filed on Nov. 22, 2017.

(51) Int. Cl.
| | |
|---|---|
| *B62M 3/08* | (2006.01) |
| *F16B 1/00* | (2006.01) |
| *A43B 1/00* | (2006.01) |

(52) U.S. Cl.
CPC .......... *B62M 3/086* (2013.01); *A43B 1/0054* (2013.01); *F16B 1/00* (2013.01); *F16B 2001/0035* (2013.01)

(58) Field of Classification Search
CPC .......... B62M 3/08; B62M 3/086; B62M 3/16; A43B 5/14; A43B 5/18; A43B 1/0054; A43B 13/14; F16B 1/00; F16B 2001/0035
See application file for complete search history.

(56) References Cited

U.S. PATENT DOCUMENTS

| | | | |
|---|---|---|---|
| 444,258 | A | 1/1891 | Tillinghast |
| 3,667,771 | A | 6/1972 | Larson |
| 4,442,732 | A | 4/1984 | Okajima |
| 5,046,382 | A | 9/1991 | Steinberg |
| 5,473,963 | A | 12/1995 | Aeschbach |
| 5,704,256 | A * | 1/1998 | De Lattre ............ A43B 1/0054 36/131 |
| 7,823,300 | B2 | 11/2010 | Fullerton et al. |
| 9,527,549 | B2 * | 12/2016 | Pepito .................... B62M 3/086 |
| 10,173,748 | B1 * | 1/2019 | Tan ........................ B62M 3/086 |
| 2011/0239817 | A1 | 10/2011 | Chang |

(Continued)

FOREIGN PATENT DOCUMENTS

| | | |
|---|---|---|
| CN | 203740087 | 7/2014 |
| CN | 104554594 | 4/2015 |

(Continued)

OTHER PUBLICATIONS

"Magnetic Safety Pedal," Magped, Date Unknown, retrieved from https://www.magped.com/, 6 pages.

(Continued)

*Primary Examiner* — Prasad V Gokhale

(74) *Attorney, Agent, or Firm* — Sheridan Ross PC

(57) ABSTRACT

A clipless pedal system is provided. In various embodiments, systems of the present disclosure comprise pedals and cleats for interaction with the pedals. At least one of a pedal and an associated cleat comprises a magnet, and at least one of the pedal and the associated cleat comprises a ferrous metal for interaction with the magnet. Geometric features are provided to enable both a secure connection between a cleat and a pedal and to enable a user-friendly release of the cleat from the pedal.

15 Claims, 19 Drawing Sheets

(56) References Cited

U.S. PATENT DOCUMENTS

2013/0269477 A1* 10/2013 Williams ............... B62M 3/086
                                                    74/594.6
2013/0298428 A1   11/2013 Tews
2016/0304156 A1*  10/2016 Pepito .................... B62M 3/086
2017/0106940 A1*   4/2017 Paick ..................... B62M 3/086
2019/0168842 A1*   6/2019 Ball ....................... B62M 3/086

FOREIGN PATENT DOCUMENTS

| CN | 204415657 | 6/2015 |
| EP | 1802519 | 7/2007 |
| EP | 1972221 | 9/2008 |
| WO | WO 2006/042622 | 4/2006 |

OTHER PUBLICATIONS

"Fly Pedals—Universal Clipless Pedal Adapter," Fly Pedals, 2019, retrieved from https://flypedals.com/, 4 pages.

* cited by examiner

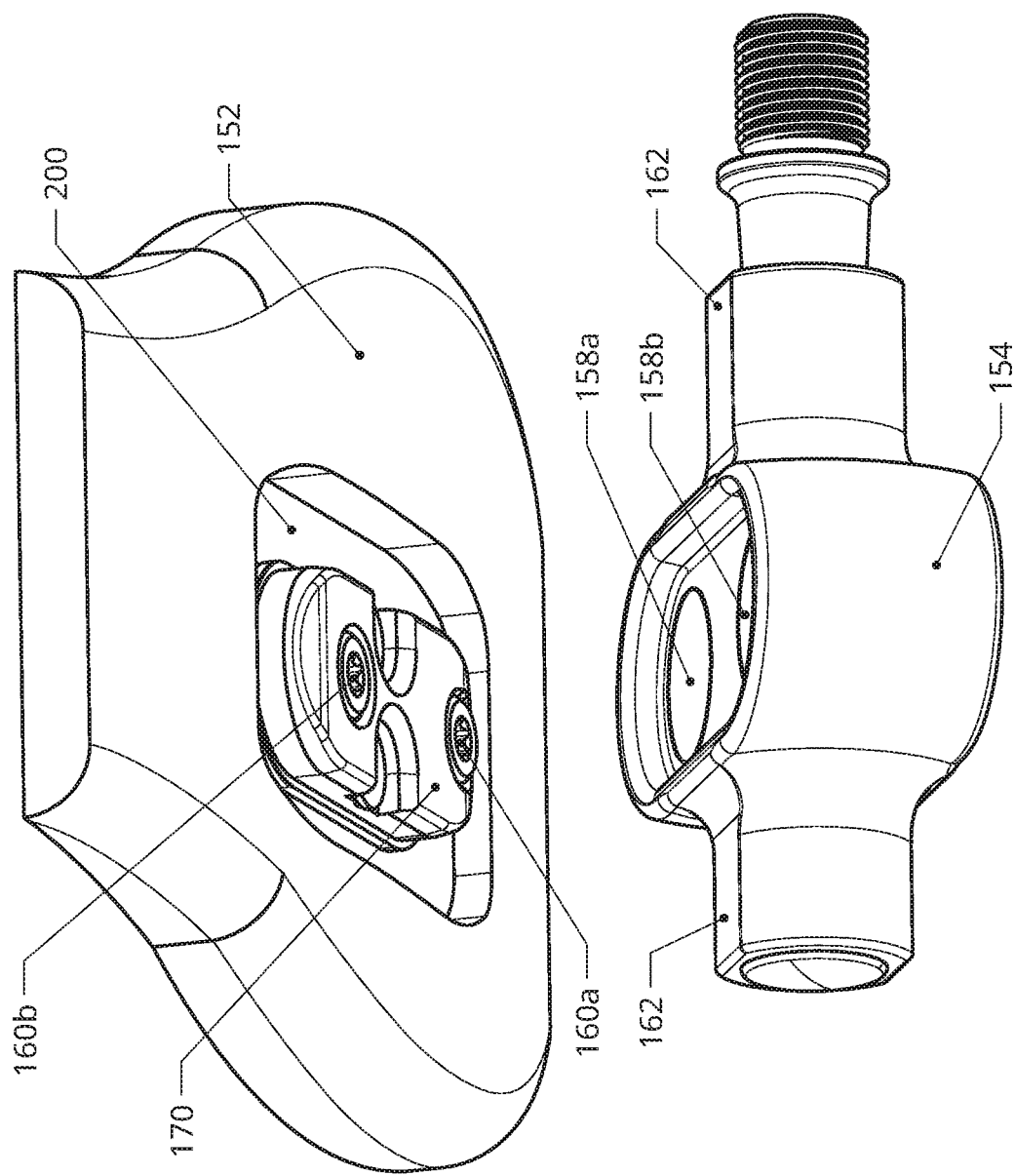

CLIPLESS PEDAL SYSTEM

CROSS-REFERENCE TO RELATED APPLICATIONS

This application claims the benefit of U.S. Provisional Patent Application Ser. No. 62/589,835, filed Nov. 22, 2017, the entire disclosures of which is incorporated by reference herein.

FIELD

The present disclosure generally relates to pedals and pedal systems for human powered vehicles including bicycles and the like. More specifically, certain embodiments of the present disclosure relate to clipless pedals, cycling shoes, and related features that comprise a magnetic connection.

BACKGROUND

Human powered vehicles including but not limited to bicycles have long relied on foot pedals as providing a user-interface and contact point and for providing a means of power transfer between a user and the vehicle. One basic foot pedal for bicycles and other human powered vehicles is commonly referred to as a "flat pedal" which comprises at least one generally flat, broad surface for receiving a human foot and an axle or spindle to render the pedal rotatable relative to a crank arm with which the pedal is connected. Flat pedals, including those shown and described in U.S. Pat. No. 444,258 to Tillinghast, which is hereby incorporated by reference in its entirety, are relatively easy to use as a user may simply step on and off the pedal. Such devices, however, fail to maximize power transmission between a user and a vehicle as a user may generally only apply force to the pedal during a down-stroke. Flat pedal systems also fail to provide a secure connection between a user and a vehicle resulting in reduced handling and comfort in certain situations.

To address certain shortcomings of flat pedals, pedal "clip" systems evolved. Pedal "clips" are also commonly referred to as "cages" or "toe cages" and are shown and described in U.S. Pat. No. 4,442,732 to Okajima, for example, which is hereby incorporated by reference in its entirety. Such devices provide a pedal portion that extends above and around an upper portion of a user's foot and in many cases also provide for straps and/or buckles to secure a user's foot to a pedal. These devices enable greater power transfer and pedaling efficiency as compared to flat pedals. Such devices and systems, however, provide safety concerns wherein users may not be able to easily connect and disconnect from pedal clips. In certain situations, such as track cycling wherein a user or rider has minimal need for engaging and disengaging a pedal, these systems are still desirable. However, for the vast majority of riders, these systems fail to provide a level of user-friendliness and safety required for frequently connecting to and disconnecting from pedals.

Relatively recently, "clipless" pedal systems have been developed to address various shortcomings of both flat pedals and pedal clips. The term "clipless", at least as used herein, refers to a category of pedals that provide a secure connection between a user's foot or shoe and the pedal but does not involve the use of a toe clip or cage. Such devices, including U.S. Pat. No. 5,046,382 to Steinberg, which is hereby incorporated by reference in its entirety, generally provide mechanical connections between a pedal and a cleat or similar feature provided on the bottom of a user's shoe. Such devices typically provide a mechanical connection similar to a ski binding wherein a portion of a pedal is spring loaded or otherwise biased toward a closed position for selectively securing to a cleat or other interface provided on the sole of a cycling shoe. Known clipless pedals and clipless pedal systems, however, fail to provide various features, structure, and advantages of the present disclosure.

SUMMARY

There has been a long-felt and unmet need to provide a clipless pedal system for human powered vehicles that provides a secure and reliable connection between a user's foot and a pedal. There has further been a long-felt and unmet need to provide such a system that further comprises the ability to quickly, intuitively, and easily disconnect from a pedal system. Various embodiments of the present disclosure provide a pedal system that addresses these needs.

In various embodiments, pedal systems for human powered vehicles are provided. In various embodiments, pedal systems are provided that are suitable for use with conventional bicycles including, for example, road bicycles, mountain bicycles, touring bicycles, etc. It will be recognized, however, that inventive and non-obvious concepts and features reside in aspects of pedal systems of the present disclosure regardless of the ultimate intended purpose or application of such pedal systems. It is contemplated that devices and systems of the present disclosure are not limited to specific applications and may be provided with or applied to various devices including, for example, stationary bicycles, recumbent bicycles, e-assist bicycles, ski and snowboard equipment, skateboards, etc.

U.S. Pat. No. 5,473,963 to Aeschbach, which is hereby incorporated by reference in its entirety, discloses a magnetic clipless pedal system. Aeschbach, however, fails to disclose various features of the present disclosure including, but not limited, devices and arrangements for connecting to and enabling disconnection from a magnetic pedal system.

U.S. Pat. No. 9,545,972 to Williams, which is hereby incorporated by reference in its entirety provides a magnetic connection between cycling shoes and a pedal. Williams, however, fails to disclose various features of the present disclosure including, for example, details and dimensions related to the interface between a shoe, cleat, and pedal.

In one embodiment, a magnetic bicycle pedal is provided that comprises a pedal body rotatably interconnected to a spindle that is operable to be secured to a bicycle component. The pedal body comprises a pocket having a recessed surface for selectively receiving at least one of a shoe and a cleat, and wherein the recessed surface is provided at least partially within a sidewall. At least one magnet is provided within the pedal body and the magnet is recessed relative to an upper portion of the sidewall. At least one lateral extension is provided adjacent to the pocket and extending in a direction substantially parallel to the spindle. In some embodiments, the pocket or pockets of the pedal comprise an ovoid shape that is operable to act as a female receiving portion for a cycling shoe cleat. In other embodiments, however, various different shapes of pockets are contemplated including, for example, circular, square, and curvilinear shapes (including, but not limited to, irregular curvilinear shapes). According, no limitation with respect to the shape of the pocket is provided.

In various embodiments, pedals are provided that comprise at least one magnet. In some embodiments, at least one powerful neodymium magnet is provided within a pedal and is operable to receive and secure a metal cleat provided on a shoe (a pre-existing cycling shoe, for example). In some embodiments, it is also contemplated that one or more magnets are provided in a cleat. Cleats of the present disclosure are contemplated as comprising angled side walls for ease of entry and alignment into a pocket or recess provided in a pedal. In preferred embodiments, a pull-out force is provided between a pedal and cleat that is great enough to attract, draw-in and maintain a connection between the pedal and the shoe even during a pedaling motion. Preferred embodiments further contemplate the disconnection of a pedal and a cleat by a natural motion of a user's foot. In some embodiments, and as shown and described herein, this natural motion comprises a movement in the "roll" orientation as opposed to conventional clipless pedals which require a movement in the "yaw" orientation to release a cleat and associated shoe/foot combination.

Although certain embodiments contemplate that a pedal comprises at least one magnet and a cleat comprises at least one of a metal and a magnet to be attracted to the magnet of the pedal, alternative embodiments contemplate that the pedal is devoid of a magnet. In such embodiments, at least one magnet is provided in a cleat member and the pedal comprises a magnetically-attractive element (e.g. ferrous metal) to establish a magnetic connection between the cleat and the pedal.

In some embodiments, one or more magnets are provided in a pedal and comprise a thickness and orientation such that at least a portion of the magnet is exposed. In preferred embodiments, pedals of the present disclosure comprise symmetrical features with connection interface (e.g. exposed magnetic elements) on at least two sides of the pedals such that a user may connect to a pedal when the pedal is provided in different orientations. This symmetry increases the ease in which a user may "clip-in" by providing multiple options to user and allowing magnetic force to help orient the pedal prior to full engagement between a cleat and the pedal.

In certain embodiments of the present disclosure, a pedal is provided comprising at least one pocket or recess that is operable to receive a cleat. In some embodiments, it is contemplated that the pocket or recess comprises an angled sidewall to receive an angled portion of a cleat. The pocket or recess and the angled sidewalls provide for ease of alignment between a cleat and a pedal and also provide for an enhanced connection wherein forward, backward, and sideways motion of the cleat is restricted.

In certain embodiments, the pocket and angled sidewalls in combination with the attractive force of magnetic features of the system allow the cleat to "home-in" and easily connect with the pedal. As the cleat moves into the pocket or recess, a gap between the cleat sidewall and the pedal narrows to a small gap and provides a safe and secure connection with anti-slip features in various directions.

The present disclosure contemplates providing angled sidewalls at various different angles. In various embodiments, a sidewall angle of a pedal recess is between 45 degrees and −30 degrees. In preferred embodiments, the sidewall angle is between approximately 10 and 15 degrees. As will be recognized by one of ordinary skill in the art, embodiments that comprise a greater angle to the sidewall will provide ease of entry but will provide an enhanced risk of accidental disconnect between pedal and cleat. Embodiments comprising negative angled sidewalls to the recess provide a high degree of pull-out resistance. The negative angle (lip) essentially locks the cleat in the direction of the force and yet still has clearance to eject by rolling the foot as in all the styles of pedals. The lip hooks under the negative angle wall of the pedal but since the cleat is shorter than the length of the pocket the cleat is free to slide in either forward or backward direction to be centered and easily rolled out of the pocket.

In various embodiments of the present disclosure, a recess or pocket is provided in a pedal that is continuous. The shape of the pedal and placement of the magnets as shown and described herein enables easy orientation of a cleat and pedal and prevents a shoe/cleat from connecting to a pedal in an incorrect orientation or relative relationship.

Embodiments of the present disclosure provide a clipless pedal system wherein a method of releasing a foot from a pedal comprises an easy and natural motion. In preferred embodiments, a magnetic connection between a cleat/shoe and a pedal is accomplished by rolling of the foot inwardly or preferably outwardly. Once the magnetic connection is released, a user may simply put his or her foot down. This motion and method of the present disclosure is enabled by various factors, and by features and concepts provided herein. As shown and described herein, pedals of the present disclosure comprise an elongate stem portion that extends on either side of the magnetic interface portion and associated recess. The stem portion provides for and is arranged to contact the sole of a shoe. Specifically, a portion of a shoe sole adjacent to a cleat is arranged to and operable to contact the stem portion(s) of the pedal. This extended stem increases the fulcrum distance between the magnets and the end of the pedal stem thereby increasing the force to roll out of the pedal.

One of skill in the art will recognize that not all cycling shoes comprise the same design. For example, cycling shoes designed for mountain biking typically comprise a heavier tread on the sole of the shoe and a pre-existing structure that provides a cleat in a recessed position. In contrast, standard road cycling shoes typically comprise a flat, smooth bottom from which a cleat extends. Embodiments of the present disclosure provide clipless pedal systems that are operable for use with various styles of cycling shoes including, but not limited to, mountain and road cycling shoes. In various embodiments, a close spatial relationship is provided between the stem portion of a pedal and the sole and/or cleat of a shoe. In various embodiments, this relationship is provided by features provided on a pedal and/or cleat in accordance with embodiments of the present disclosure.

In various embodiments of the present disclosure, pedals are provided wherein a distance between a centerline or user contact point and a crank arm is adjustable. In some embodiments, a distance between a contact point or lateral centerline of a pedal and a crank arm to which the pedal is attached is adjustable by the provision of one or more shims proximal to a flange provided on the pedal spindle.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 19 is a perspective view of a pedal system according to one embodiment of the present disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

FIGS. 1-19 provide various views of clipless pedal systems according to embodiments of the present disclosure. Clipless pedal systems of the present disclosure include, but are not limited to, pedals and cleats. Pedals as shown and described herein comprise a threaded spindle and are operable to be provided in connection with pre-existing crank arms of a drivetrain of a bicycle (for example). Cleats as shown and described herein are contemplated for use with various different pre-existing footwear (e.g. cycling shoes). It will be recognized, however, that the features and devices shown and described herein are not limited to connection with or combination with any particular pre-existing device.

Figure 1:
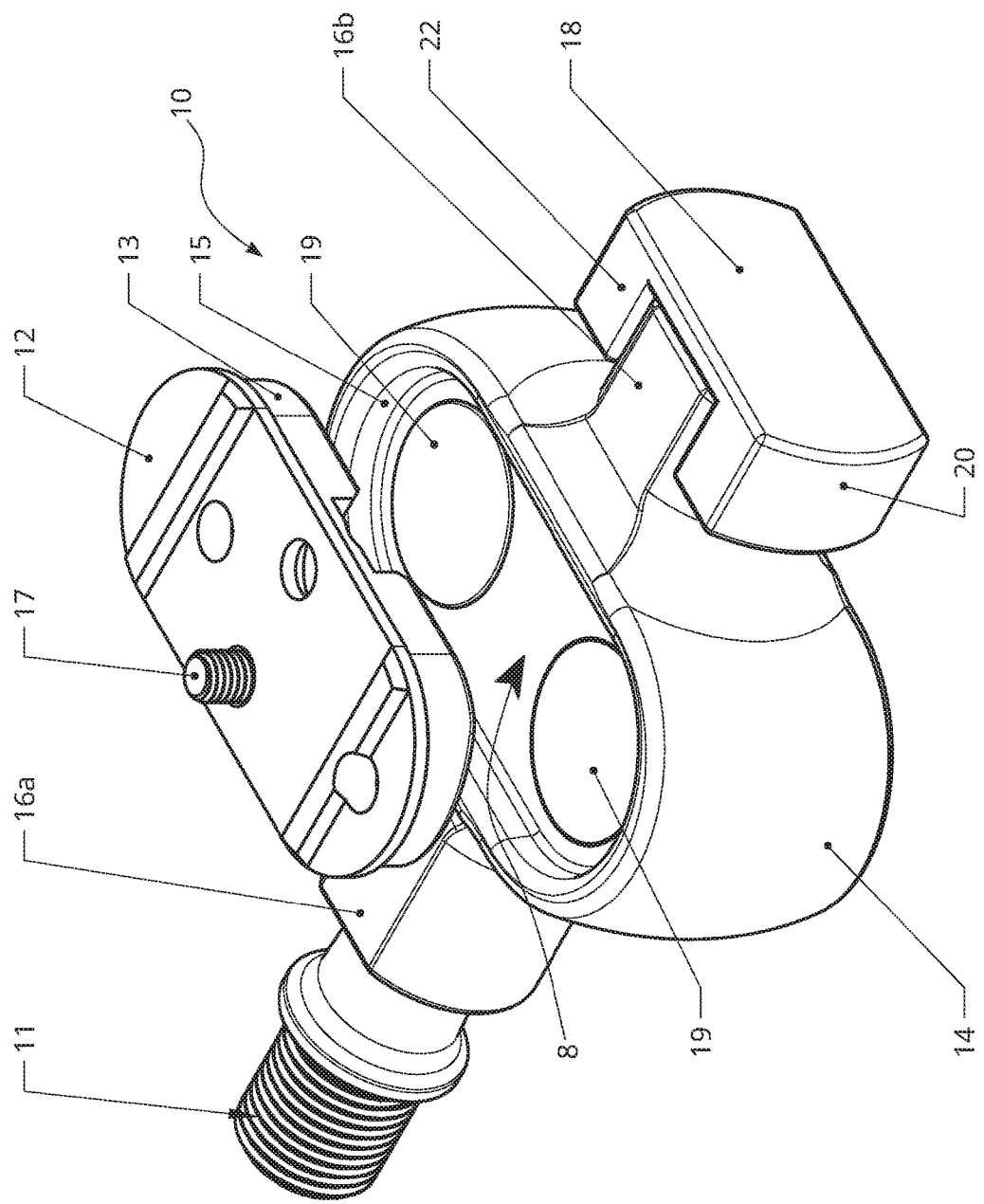
FIG. 1 is a perspective view of a clipless pedal system according to one embodiment of the present disclosure.

FIG. 1 is a perspective view of a pedal system 10 comprising a pedal 14 and cleat 12 according to one embodiment of the present disclosure. As shown, the pedal 14 is contemplated as comprising one of a pair of pedals that is operable to be connected to the crank arm of a bicycle drivetrain or various similar devices (not shown in FIG. 1). The pedal 14 is capable of being provided in communication with a crank arm by a threaded portion of a spindle 11. According to various embodiments of the present disclosure, a cleat 12 is securable to a shoe (not shown) by means of an attachment, such as a fastener 17. The cleat 12 comprises an angled wall 13, which mates with an angled pocket wall 15 of the pedal 14. In various embodiments, the angled wall 13 is provided at an angle of between approximately 2 and 50 degrees, and more preferably of between approximately 5 and 45 degrees. In at least one embodiment, the angled sidewall 13 of the cleat 12 comprises an angle of about 10 degrees.

According to some embodiments of the present disclosure, flush surfaces 16a, 16b are provided laterally adjacent to a cleat receiving area or void 8. The flush surfaces 16a, 16b are operable to receive and/or be provided in contact with at least a portion of a shoe sole. A rotatable cap 18 is provided on a distal end of the pedal 14. The cap 18 comprises an oblong geometry as shown in FIG. 1. The cap 18 is rotatable between at least the position shown in FIG. 1 and a position that is perpendicular thereto (see FIG. 2, for example). The oblong shape and rotatable nature of the cap 18 allows a user to select one of at least two positions. A first position (FIG. 1) is contemplated as comprising a configuration that is suitable or operable for use with mountain biking shoe soles that are known to have more material and a nested or recessed cleat. The second position, as shown and described in more detail with respect to FIG. 2, comprises a position of decreased clearance that is suitable and operable for use with road shoe soles. Left and right pedals 14 may comprise mirrored structures. In some embodiments, pedals 14 are provided that may be mounted on either side of a bicycle, but wherein the left side pedal preferably comprises a reverse-thread on the spindle 11.

In various embodiments, pedals 14 of the present disclosure including that shown in FIG. 1 comprise at least one magnet 19. In preferred embodiments, a pair of super magnets 19 are provided within the cleat receiving area 8. The super magnets 19 are operable to receive and connect to a ferrous cleat and/or magnets comprising an opposite polarity that are provided in a cleat.

Figure 2:
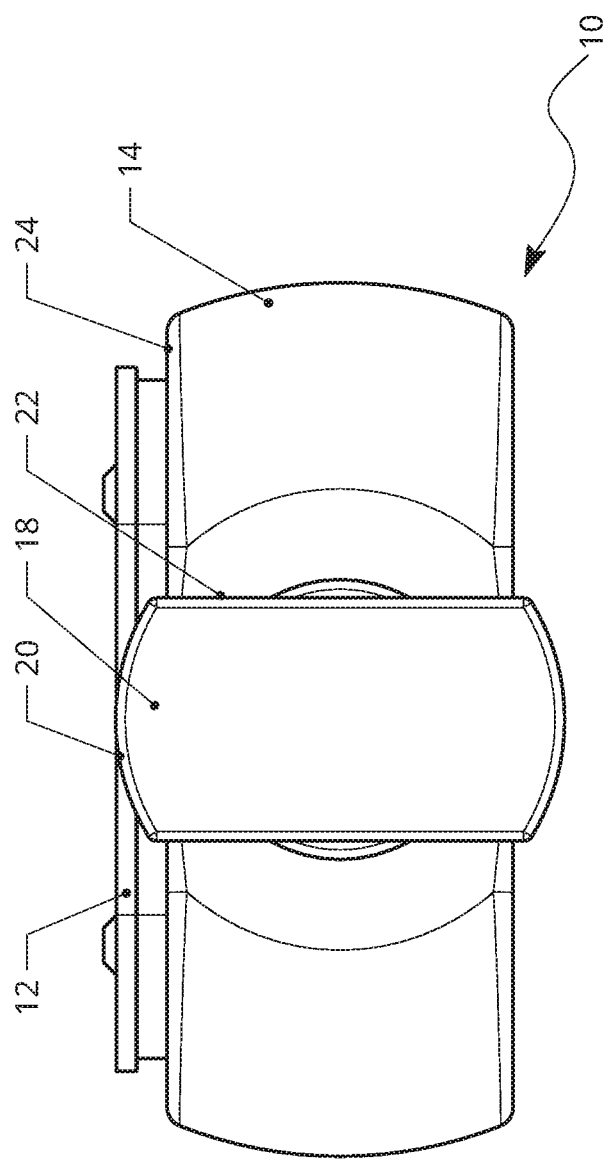
FIG. 2 is a side elevation view of a clipless pedal system according to one embodiment of the present disclosure.

FIG. 2 is a side elevation view the pedal system 10 according to the embodiment of FIG. 1. The system 10 of FIG. 2 is shown as comprising a cleat 12 in the form of various known, pre-existing road cleats. The rotatable cap 18 is shown as being rotated ninety-degrees relative to FIG. 1, and wherein a second surface 20 is positioned such that it may interface with a road shoe or road cleat. The flush surface 22 is provided in a position of non-use (at least relative to the position of FIG. 1). As shown in FIG. 2, an upper portion of the second surface 20 extends at least partially above a lip 24 of the pedal and provides a surface that is operable to interact with the underside of a shoe and/or pedal to reduce tilting or roll of the shoe and to provide contact and leverage for a removal operation of a shoe when desired.

Figure 3:
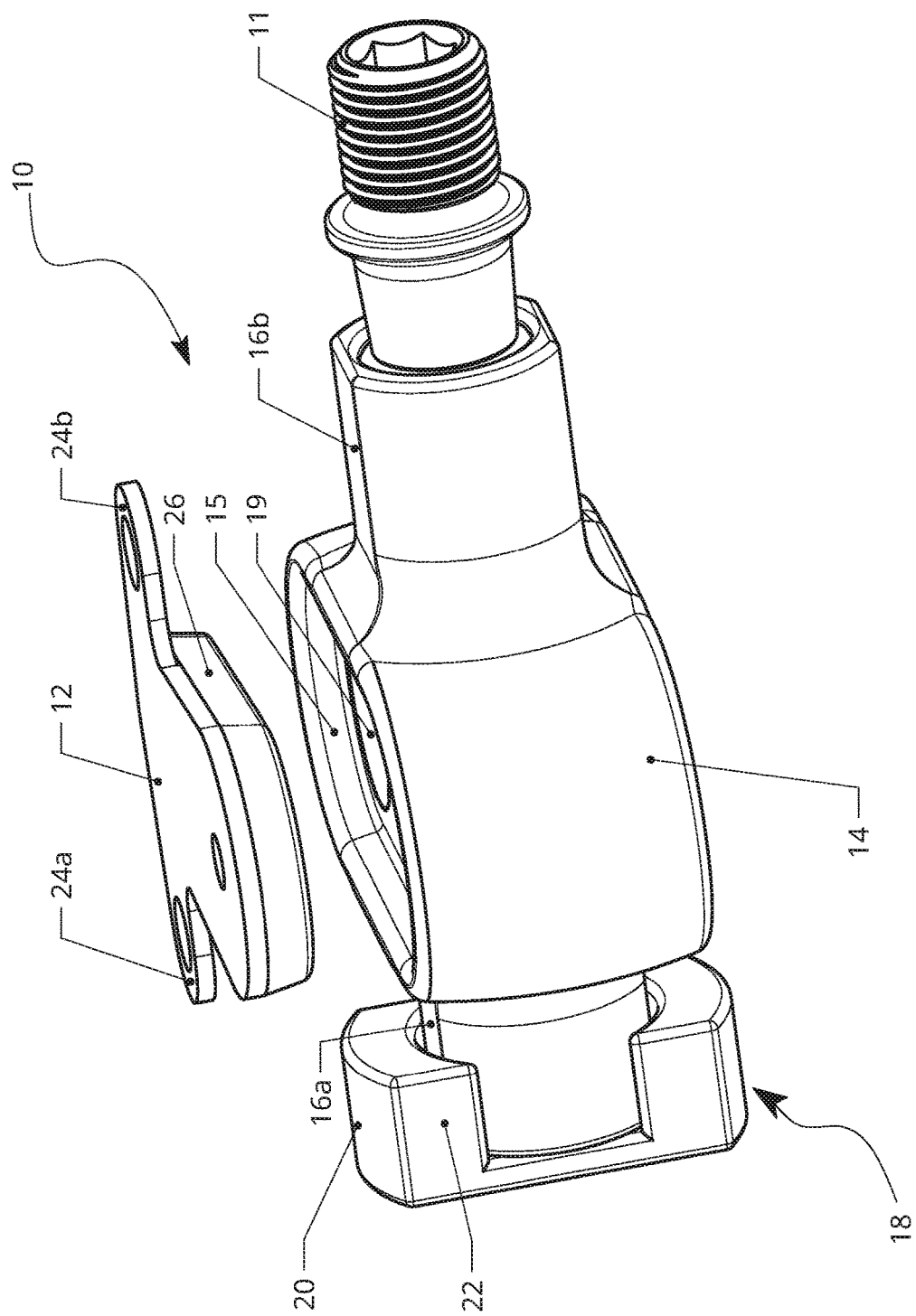
FIG. 3 is a perspective view of a clipless pedal system according to one embodiment of the present disclosure.

FIG. 3 is a partially exploded perspective view of a pedal system 10 showing a road cleat 12 spaced apart from the pedal 14. It will be appreciated that different "cleats" are depicted and contemplated and not all possible variations are shown. The cleat 12 of FIG. 3 comprises lateral extensions 24a, 24b. The anti-tilt cap 18 of the pedal 14 is provided such that at least one of a shoe and a portion of the cleat 12 (one of the lateral extensions 24a, 24b, for example) will rest on the contoured surface 20 of the cap 18. The cleat 12 comprises an angled sidewall 26, and the pedal 14 comprises at least one corresponding angled pocket wall 15 that is operable to mate with the angled sidewall 26 of the cleat 12.

Figure 4:
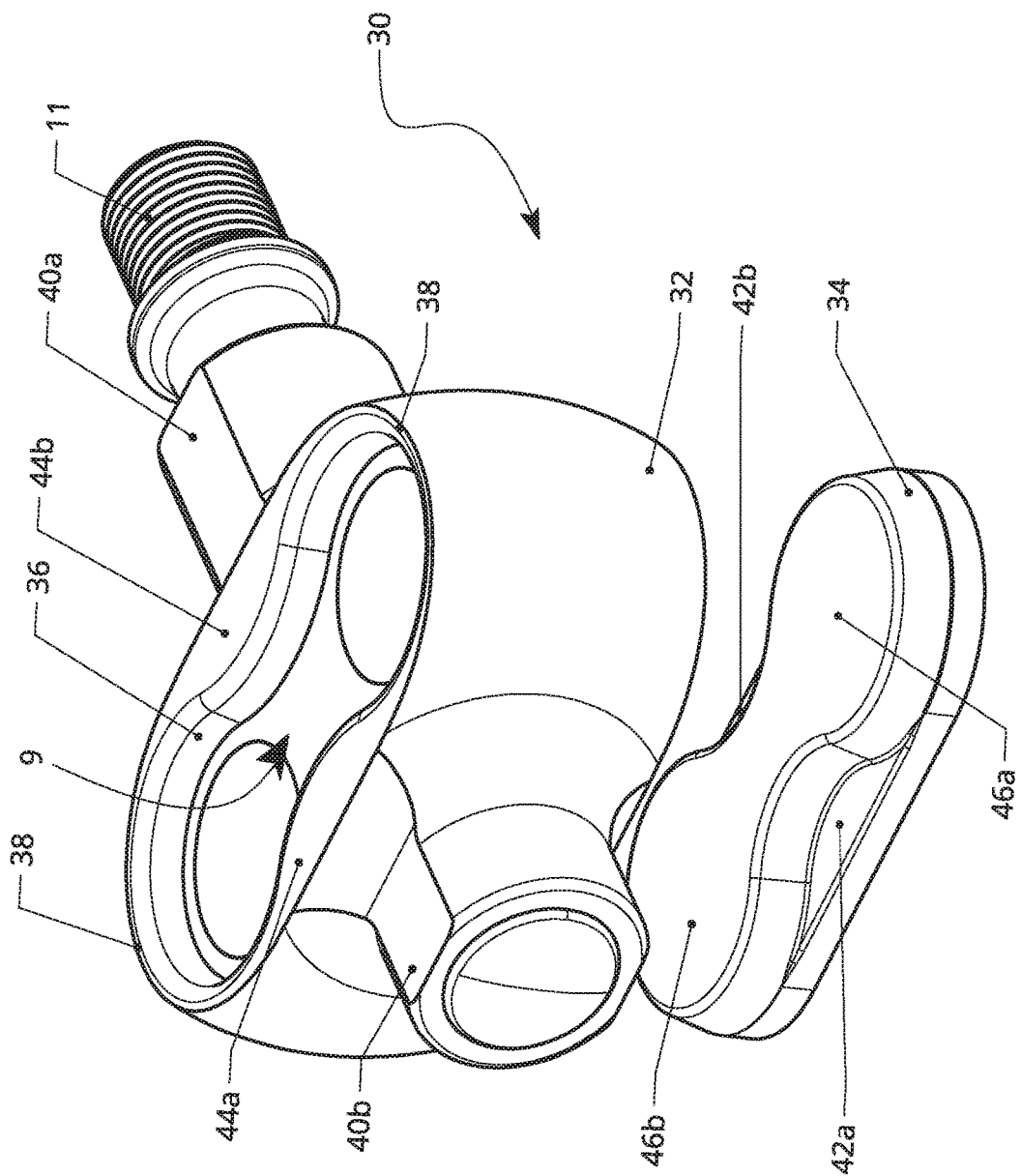
FIG. 4 is an exploded perspective view of a clipless pedal system according to one embodiment of the present disclosure.
Figure 5:
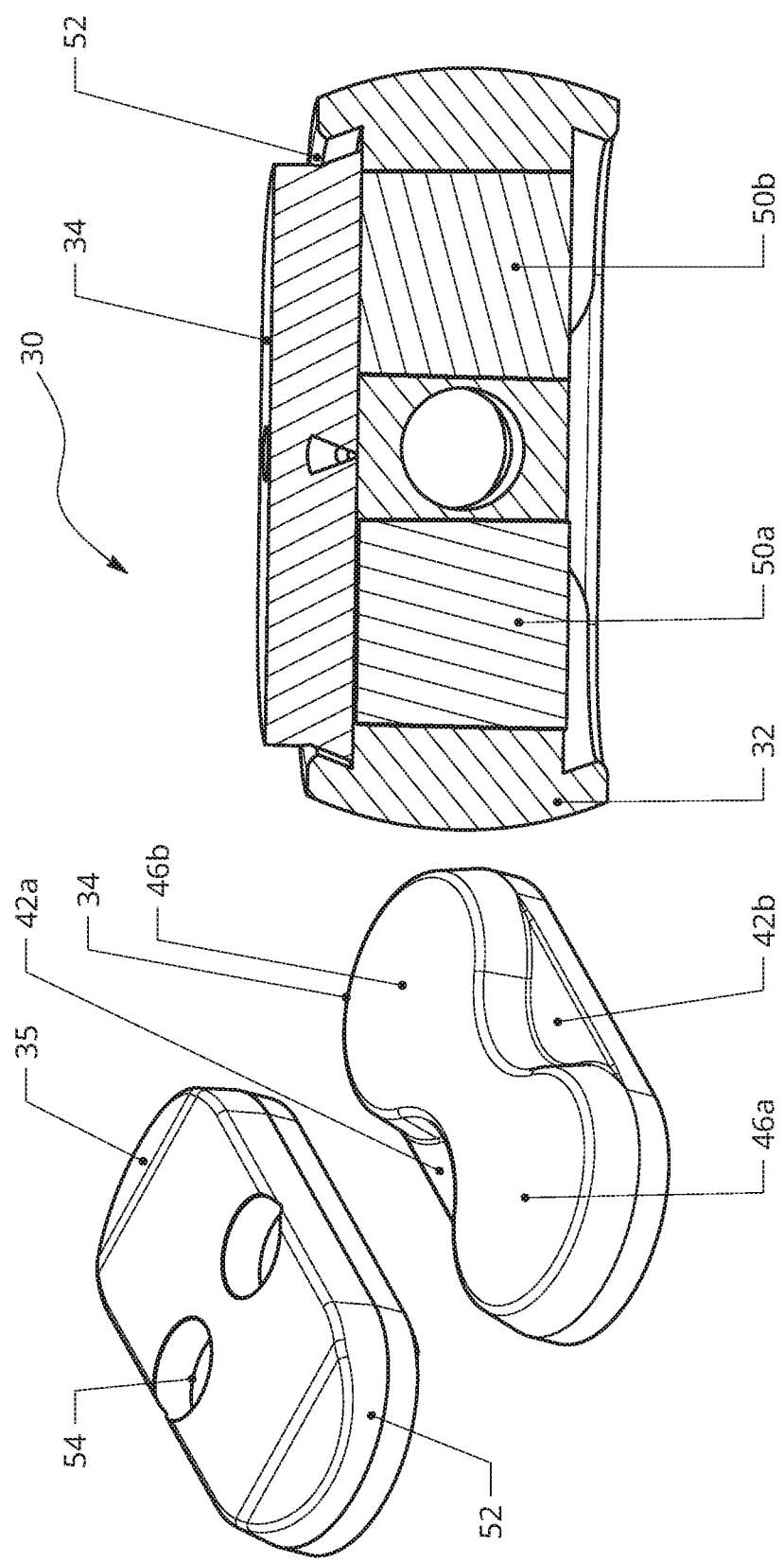
FIG. 5 provides a cross-sectional view of a pedal according to one embodiment of the present disclosure and cleats operable for use with the pedal.

FIGS. 4-5 depict a pedal and associated cleats according to an alternative embodiment of the present disclosure. It will be recognized that at least some inventive aspects of the present disclosure reside in the structure of a pedal and cleat system without regard to specific geometries. Accordingly, various geometries are contemplated including, but not limited to, those shown in FIGS. 4-5. As shown in FIG. 4, the pedal 32 comprises a pedal body with an upstanding wall 36 and a curvilinear lip 38. Lateral extensions 40a, 40b are provided exterior to the recessed area 9. The cleat 34 comprises a corresponding curvilinear shape that is operable to be received within the recess. The cleat further comprises planar portions 42a, 42b that are operable to contact upper surfaces 44a, 44b of the pedal. FIG. 5 depicts two different cleat geometries contemplated by the present disclosure, and a cleat 34 provided within the pedal 32.

The angular side walls 52 enhance the ease of entry of a cleat into the pocket 54 of the pedal 32. In the depicted embodiment, a plurality of magnets 50a, 50b are provided within the pedal 64 and are operable to communicate with at least one cleat or attachment member comprising a ferrous or magnetically-attracted material. The cleats 34, 35 comprise a shape that fits or nests in a pocket or void of the pedal with a tight tolerance such that the cleats and associated shoes are provided with minimal "float." As used herein, and as will be recognized by one of ordinary skill in the art, "float" refers to a movement of a cleat or shoe in a "yaw" type motion (such as a vertical axis extending out of the pedal and perpendicular to a spindle). In alternative embodiments, cleats and pedals are sized and shaped to allow for float of up to approximately 45 degrees. Conventional pedals offer some degree of float for a user's foot, and typically to enhance comfort, address knee issues, and accommodate different riding styles. Such known device, however, provide various risks of accidental ejection of a shoe from a pedal as the float or yaw motion of a shoe is the same motion required to exit such pedals. In contrast, embodiments of the present disclosure provide for cleat and pedal systems that rely upon a "roll" type motion to disengage a shoe or foot from a pedal. Accordingly, at least in embodiments that provide a user with a degree of float, the present disclosure provides users with the ability to "float" or adjust the position of their foot without risk or fear of accidental disengagement between a shoe and a pedal.

Figure 6:
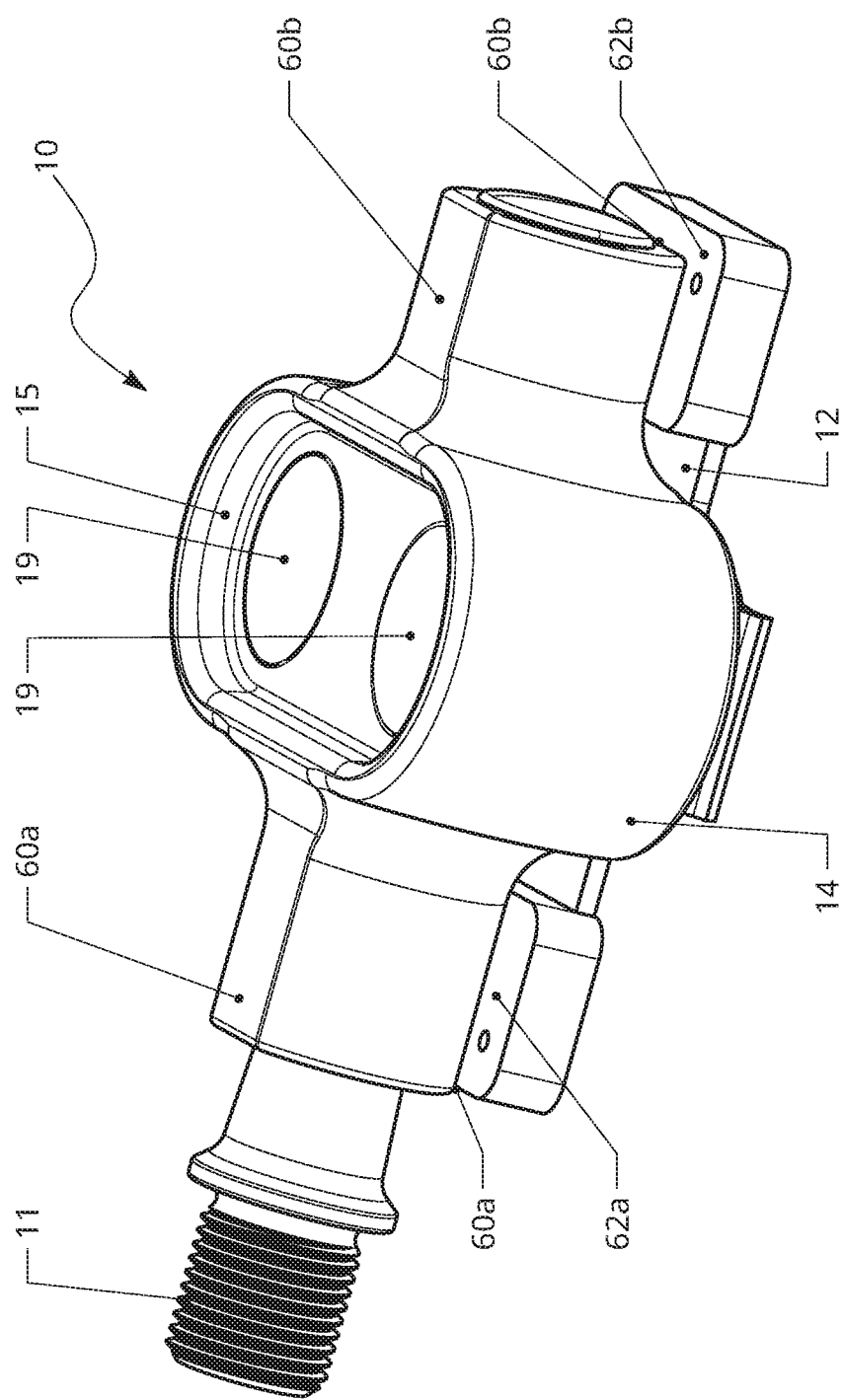
FIG. 6 is a perspective view of a cleat and pedal system according to one embodiment of the present disclosure.

FIG. 6 is a perspective view of a cleat and pedal system 10 according to another embodiment of the present disclosure. As shown, the system 10 comprises a cleat 12 and a pedal 14. The pedal 14 comprises magnets 19 that are operable to communicate with and connect to magnets provided in the cleat 12. The cleat 12 of FIG. 6 comprises lateral support members 62a, 62b. The cleat 12 and pedal 14 are shown in isolation for illustrative purposes, but are adapted to be connected to a shoe and a crank arm of a bicycle, respectively. The lateral support members 62a, 62b generally comprise lateral extension of the cleat 12 that are operable to contact first and second support surfaces 60a, 60b of the pedal 14. In a connected state, as is shown in FIG. 6, the lateral support members 62a, 62b provide for a greater contact area between the pedal 12 and the cleat 14. Additionally, and as will be shown and described in more detail herein, the lateral support members 62a, 62b provide leverage to assist or enable a removal motion of the cleat and the pedal.

Figure 7:
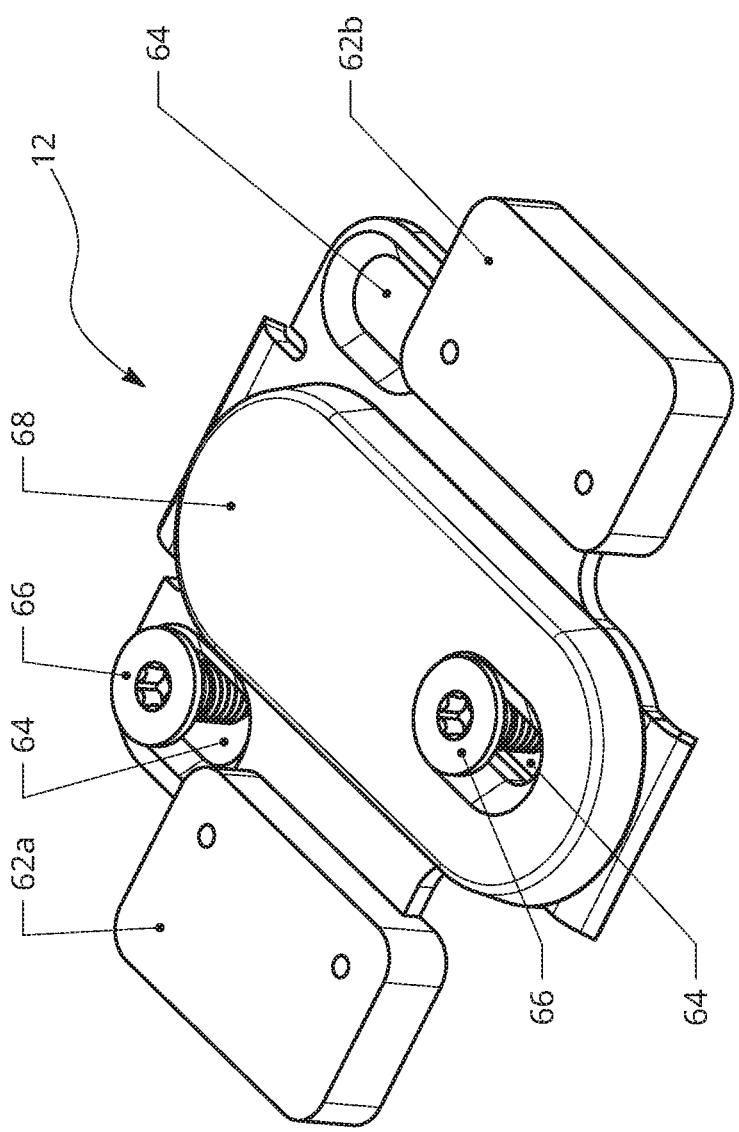
FIG. 7 is a perspective view of the cleat according to the embodiment of FIG. 6.

FIG. 7 is a perspective view of a cleat 12 shown in isolation. The cleat 12 is operable and intended to be secured to a bottom portion of a cycling shoe. Specifically, the cleat 12 comprises a plurality of apertures 64 through which fasteners 66 are provided to secure to the cleat 12 to a shoe (not shown). As shown, lateral support members 62a, 62b are provided on a cleat 12. The lateral support members 62a, 62b provide for a larger support and pressure pad, and provide a fulcrum point at which the shoe/cleat combination may be rolled off of the pedal.

Figure 8:
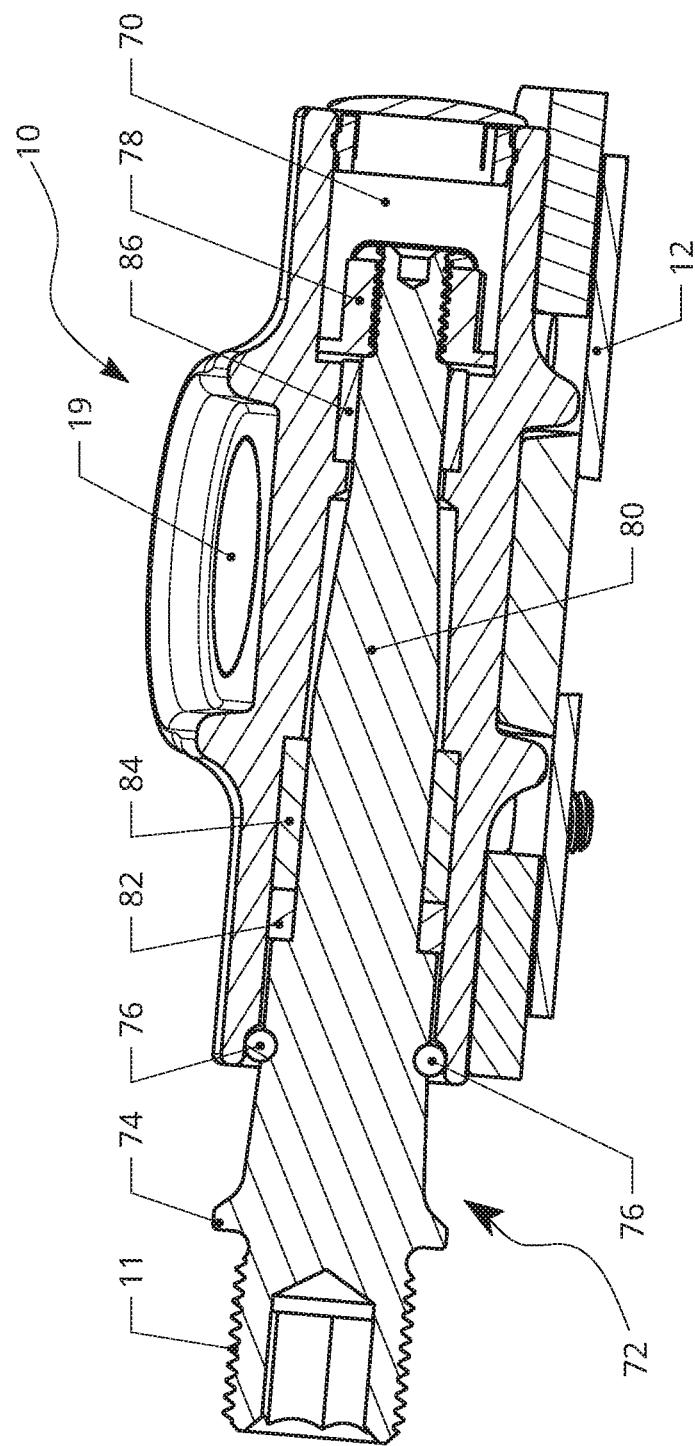
FIG. 8 is a cross-sectional view of a pedal and cleat system according to one embodiment of the present disclosure.

FIG. 8 is a cross-sectional view of a pedal and cleat system 10 according to one embodiment of the present disclosure. As shown, pedal and cleat 12 comprise various features shown and described herein. Specifically, and as shown in FIG. 8, the pedal 14 comprises a spindle 80 with a threaded portion 11 operable to connect to a crank arm (for example). The spindle 80 comprises a flange 74 interior to the threaded portion 11 and extends to a second threaded portion provided within a nut 78. The nut secures the assembly as shown in FIG. 8 and is provided within a void space 70 in the pedal. A plurality of bearings or bushings 82, 84, 86 are provided to provide desired rotational capabilities required of a pedal. Although three bushings are shown in FIG. 8, no limitation is provided with respect the number, type, or size of bearings and bushings that are provided within a pedal. For example, although two adjacent bushings 82, 84 are shown, this pair of bushings is contemplated as being replaced by a single bushing in at least some embodiments. An O-ring or gasket 76 is provided to seal and protect internal components of the pedal.

Figure 9:
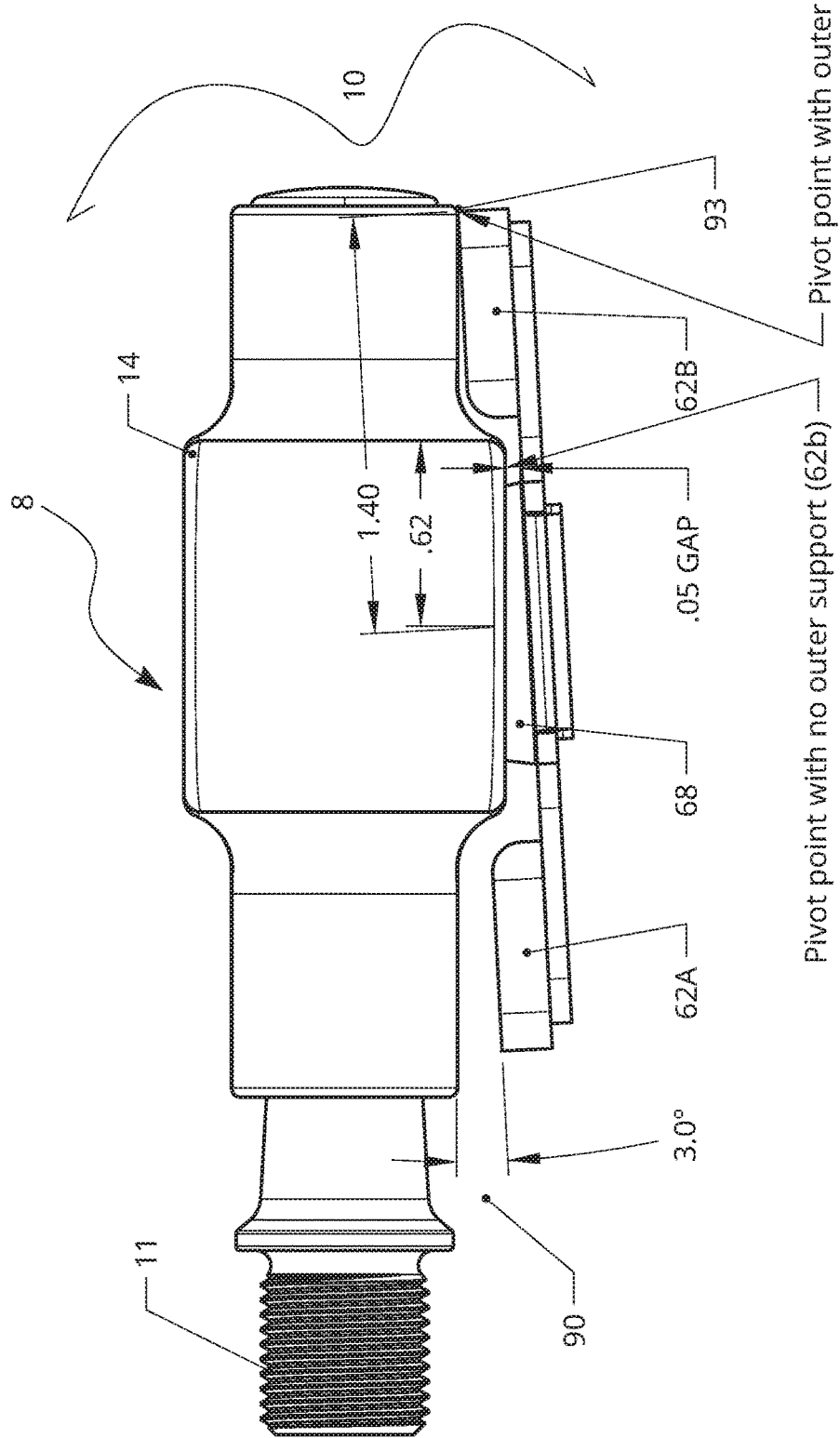
FIG. 9 is an elevation view of a cleat and pedal system according to one embodiment of the present disclosure.

FIG. 9 is an elevation view of a pedal and cleat system according to one embodiment of the present disclosure. As shown, the cleat comprises lateral support members 62a, 62b. In the position shown in FIG. 9, the cleat 12 is rotated about a horizontal axis to a detachment angle 90 that comprises an angle of approximately 3.0 degrees. At this position, the detachment angle 90 is sufficient to provide an exterior portion of a lateral support member 62B in contact with an exterior portion of the pedal 14. This contact point 93 provides a fulcrum point about which the cleat 12 must be rotated to detach the contact portion 68 of the cleat 12 from the pedal 14. The arrangement of FIG. 9, including the lateral support member 62b in contact with the pedal at the fulcrum point 93 at a distance away from a midline of the magnet(s) provides an increase in the needed extraction force of the cleat and shoe from the pedal.

In various embodiments, a magnetic force of attraction is provided between a pedal and a cleat that is between approximately 10 pounds and 150 pounds. In preferred embodiments, the magnetic force is between approximately 40 and 100 pounds. In certain preferred embodiments a force of approximately forty pounds per magnet (or about eighty pounds per pedal) is provided between a pedal and a cleat. In other words, a tensile force of between approximately 20 and 100 pounds, and preferably of about 80 pounds, provided in a direction that is orthogonal to a planar surface of the portion of the pedal comprising magnets is required to detach the cleat and pedal. As one of ordinary skill in the art will understand, this axial force is rarely encountered during normal riding conditions. For at least a portion of a pedal cycle, a rider will be providing some degree of downward or compressive force to the pedal. Even during an "upstroke" motion, however, the angle and inclination of a user's foot is typically provided such that a pure tensile force is rarely provided. Applicant has determined that the magnetic forces herein are advantageous to maintain an attachment between a pedal and a cleat, to allow a user to maximize power input into a bicycle, to maintain a safe and desirable connection to a bicycle, and to also enable relative ease of detachment from the pedal when desired. The detachment motion, as shown and described herein, is achieved by a "rolling" motion of the foot.

As further shown in FIG. 9, a contact or fulcrum point 93 is provided at an outer portion of the pedal, and wherein the contact portion 68 of the cleat is being rolled or pivoted out of the pocket 8 of the pedal. In various embodiments, the distance between a center of the magnetic force and the fulcrum point 93 is between approximately 1.0 and 3.0 inches. In preferred embodiments, this lateral distance is between approximately 1.25 and 1.75 inches. In a preferred embodiment, this distance is approximately 1.40 inches. However, one of ordinary skill in the art will recognize that this distance may be varied based on various considerations including, but not limited to, the strength of a magnetic attractive force between the cleat and pedal. As is further shown in FIG. 9, the absence of the lateral extension 62B would shift the pivot of fulcrum point closer to the center of the magnet(s). In the absence of the lateral extension 62B, the fulcrum point would be provided approximately 0.62 inches from the center of the magnet(s). Although certain embodiments contemplate such an arrangement, this requires significantly less removal force than providing the fulcrum at a lateral edge of the pedal. One of ordinary skill in the art will recognize that the objectives of the lateral extensions 62a, 62b of FIG. 9 are also satisfied in other embodiments by a pre-existing sole of a mountain bicycling shoe and/or the cleat bases as shown and described herein.

Figure 10:
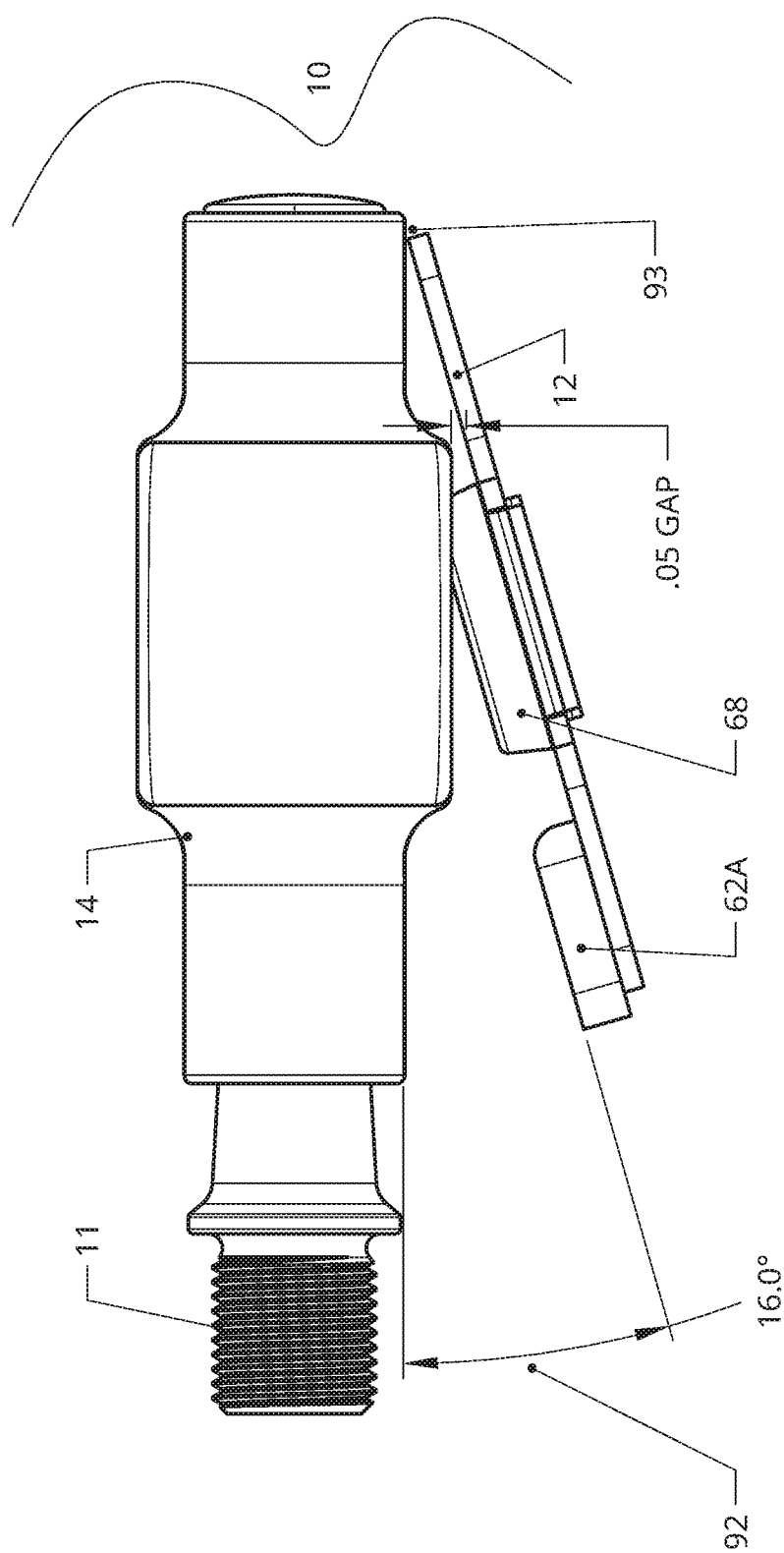
FIG. 10 is an elevation view of the cleat and pedal system according to the embodiment of FIG. 9.

FIG. 10 is an elevation view that is provided for illustrative purposes. The system of FIG. 10 comprises the same construction and structure as that of FIG. 9, but wherein the outboard lateral extension 162b of FIG. 9 has been removed. In this arrangement, and where no lateral extension is provided, the fulcrum point 93 or contact between the pedal and the cleat is moved inboard (closer to the magnet). This alternative fulcrum length, while contemplated by embodiments of the present disclosure, provides for a reduced extraction force at least relative to the embodiment of FIG. 9. Although this reduced force may be desirable for some user's, the Applicant has found that the movement of the fulcrum point away from the center of the magnet provides for an increased extraction force that is, or at least may be, preferable to most users and riders.

Figure 11:
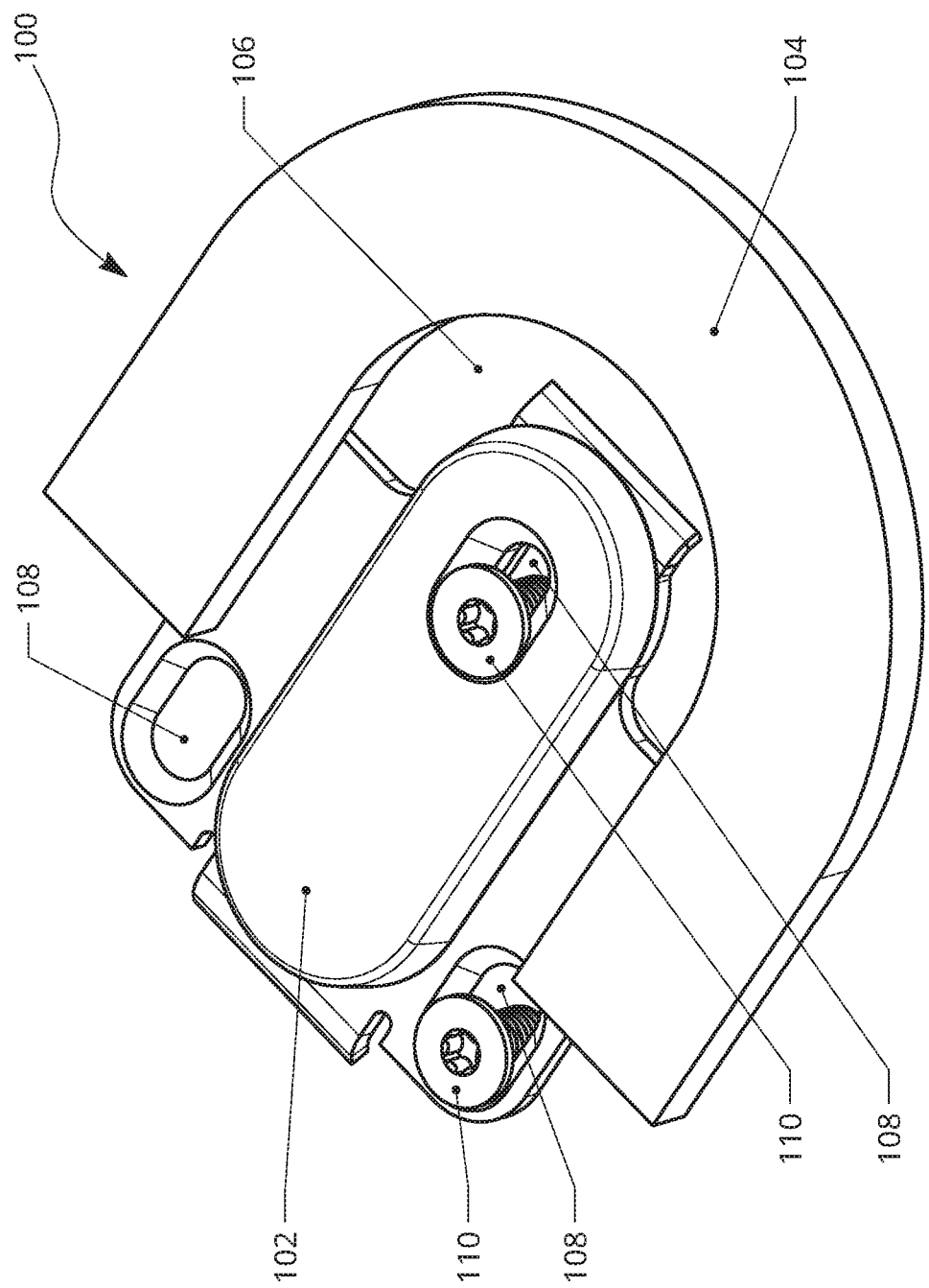
FIG. 11 is perspective view of a cleat according to one embodiment of the present disclosure.

FIG. 11 is a perspective view of a cleat 100 according to one embodiment of the present disclosure. The cleat 100 comprises a U-shaped support member 104. The support member 104 creates a contact surface and fulcrum point with a pedal that increases a required removal force and prevents or minimizes the risks of unintentional ejection from the pedal 100. The cleat comprises a plurality of apertures 108 for receiving fasteners 110 and securing the cleat 100 to a shoe. A contact portion 102 is provided that is operable to nest within an connect to a pedal. The contact portion 102 preferably comprises a magnetically-attractive material (e.g. steel). In alternative embodiments, magnets of opposite polarity relative to those provided in the pedal are contemplated.

Figure 12:
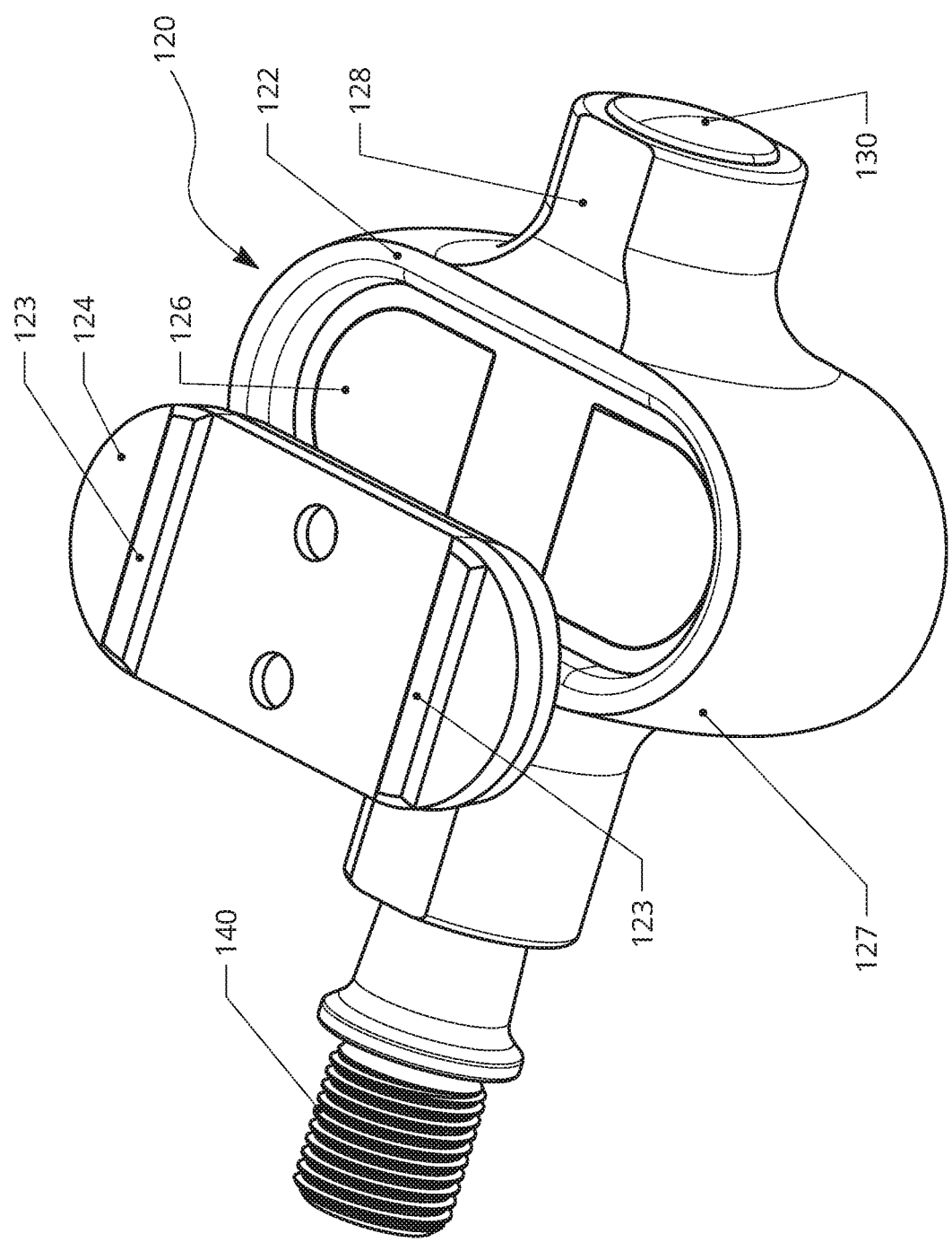
FIG. 12 is a perspective view of a pedal and cleat system according to another embodiment of the present disclosure.

FIG. 12 is a perspective view of a pedal system according to one embodiment of the present disclosure. The pedal 120 of FIG. 12 comprises D-shaped magnets 126 for enhanced holding power. A square magnet of the same width and length is substantially stronger than a cylinder due to an increase in volume. The D-shaped magnets 126 are provided to maximize a volume of the pedal that the magnet may occupy and therefore increase holding strength.

It will be recognized that various types and/or shapes of magnets are contemplated as being provided within pedals of the present disclosure. No limitation with respect to magnetic force, magnet size, or magnet type is provided herewith. It is contemplated that these parameters may be adjusted to account for pedal size, cleat size, shoe size, desired attractive force, etc.

The pedal 120 comprises various features shown and described herein including, for example, a lip 122 surrounding a recess, a body portion 127, and at least one contact surface 128 for receiving and communicating with a cleat. The pedal 120 is operable to communicate with various cleats as shown and described herein.

In various embodiments, projections 123 are provided on a shoe-side of the cleat 124. The projections are operable to provide a contact point and pressure upon a shoe sole to increase an attachment between the cleat and the shoe, particularly when the cleat is applied to shoe soles having a convex surface.

Figure 13:
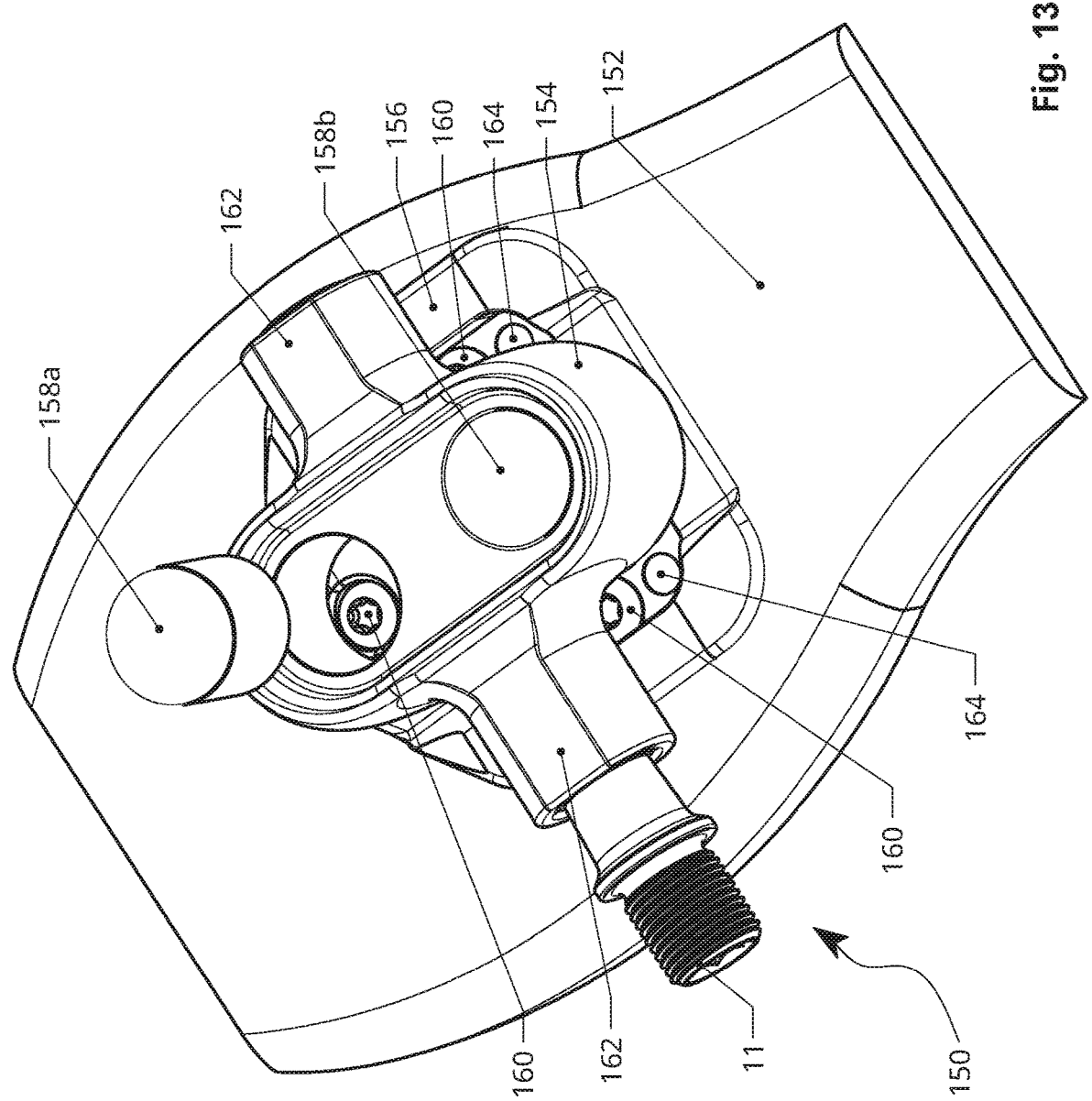
FIG. 13 is a perspective view of a pedal and cleat system according to another embodiment of the present disclosure.

FIG. 13 is a perspective view of a pedal and cleat system 150 according to another embodiment of the present disclosure. A portion of a shoe sole 152 is provided in FIG. 13. A pedal 154 is shown in communication with and attached to the shoe sole 152. The pedal comprises various features and structures shown and described herein including, for example, a pedal body with magnets 158a, 158b provided within a pocket or recess, lateral extensions 162 with support surfaces and a spindle with a threaded connection for attaching the pedal 154 to a bicycle component. The system 150 of FIG. 13 comprises a cleat base 156 that is secured to the shoe sole 152 by a plurality of fasteners 160. The cleat base 156 generally comprises a bracket member extending around an attachment portion of the system (see 12 of FIG. 1, for example) and in at least some embodiments renders the system operable for use with road cycling shoes that generally do not comprise texture, tread, or detail on the sole. More specifically, the cleat base 156 extends around an attachment portion or cleat (not shown in FIG. 13), provides protection to the cleat (e.g. when walking) and provides a contact and force-transmitting surface for contact with the lateral extensions 162 of the pedal 154. The cleat base 156 is adjustable at least in a fore-aft direction along the shoe sole as will be shown and described in more detail herein. In preferred embodiments, the bracket 156 comprises a non-ferrous material such as a nylon or plastic that is not attracted to the magnets provided in the pedal.

Figure 14:
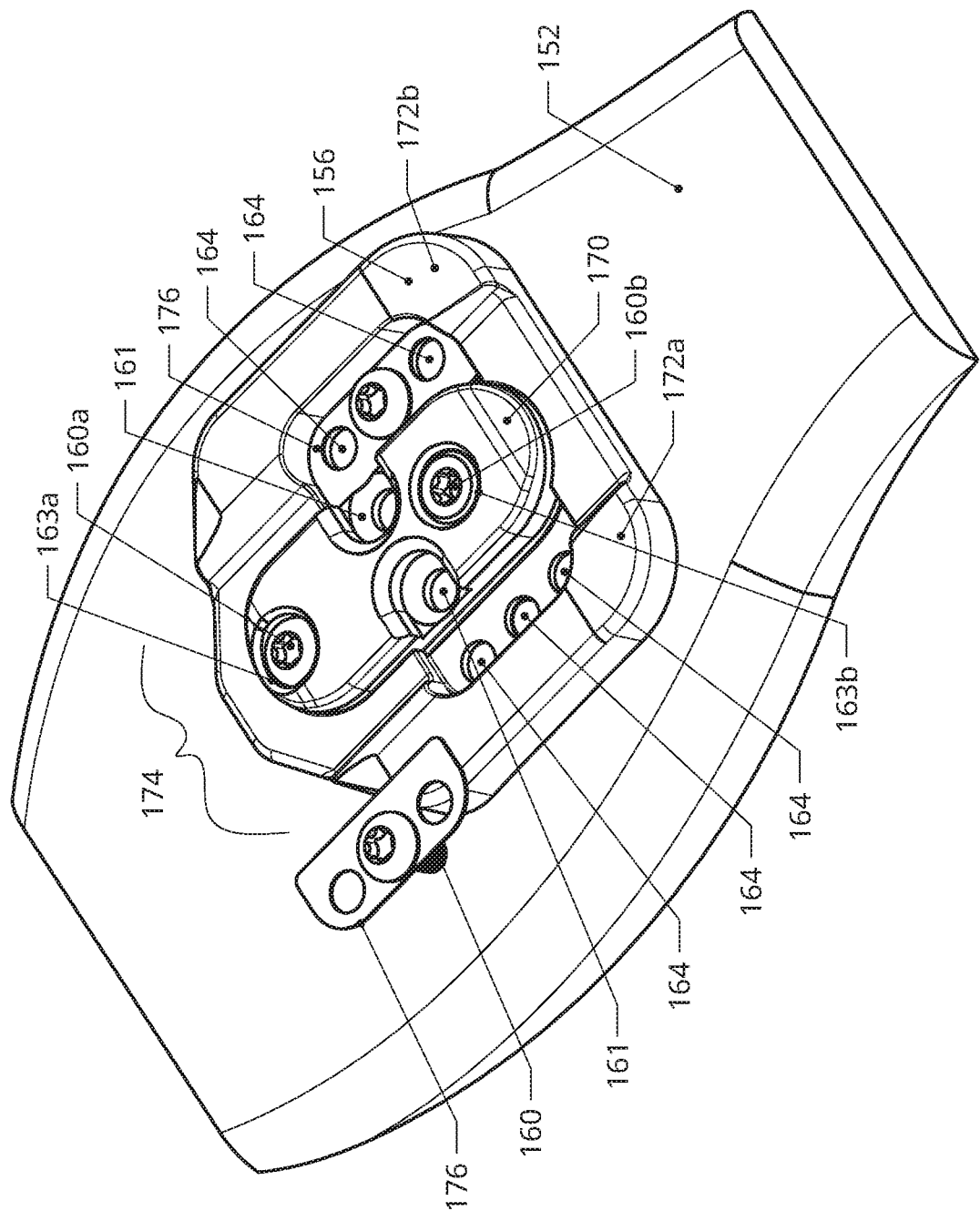
FIG. 14 is a perspective view of the system of the embodiment of FIG. 13.
Figure 15:
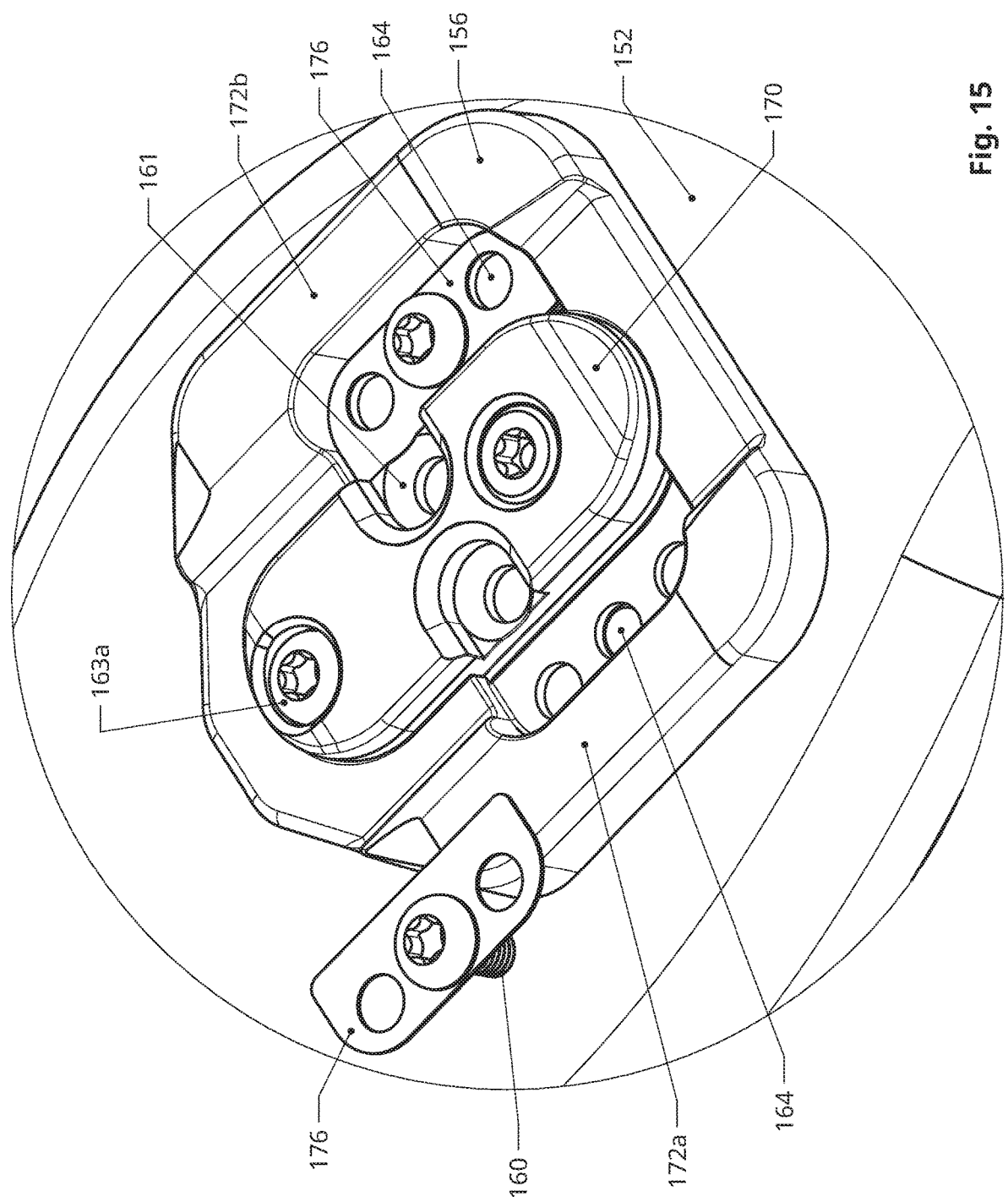
FIG. 15 is a detailed perspective view of the system of FIGS. 13-14.

FIGS. 14-17 are perspective views of the system of the embodiment of FIG. 13 with the pedal removed for illustrative purposes. As shown in FIGS. 14-15, an attachment portion 170 is connected to a shoe 152 and is operable to communicate with and selectively connect to the pedal. The attachment portion 170 or cleat member preferably comprises a ferrous metal material that is attracted to the magnets of the pedal. In some embodiments, the attachment portion 170 comprises a stainless steel. The attachment portion 170 is comprises an arrangement and pattern of apertures 161, 163 that allow the attachment portion 170 to be secured to different shoes and provided in different positions. One of ordinary skill in the art will recognize that user's will either desire to or be required to position devices of the present disclosure on a shoe sole in different positions based on a rider's build, physiology, biomechanics, and preferences. The attachment portion 170 of at least some embodiments of the present disclosure comprises a pair of fore-aft apertures 163*a*, 163*b*. The fore-aft apertures 163*a*, 163*b* are provided at different distances from the mid-line of the cleat as shown in FIGS. 14-15. Accordingly, providing the attachment portion 170 in one positions allows it to be positioned relative to the shoe sole in a different location than if and when the attachment portion 170 is rotated 180 degrees. The attachment member 170 is preferably secured at a forward portion by a first fastener 160*a* that extends into a female threaded portion on the shoe sole. A second fastener 160*b* is provided in the aft position that does not extend into the shoe sole, as most existing cycling shoe soles do not comprise a female aperture in the position of the second fastener 160*b*. Instead, the second fastener preferably comprises a shorter fastener that extends into but not beyond the cleat. the second fastener 160*b* is provided to maintain the magnetic integrity of the cleat and to prevent then unwanted entry of debris into the system.

The attachment portion 170 is surrounded by and provided within a bracket 156 that is also secured to the shoe 152. The bracket or "cleat base" provides multiple functions. One function of the bracket 156 is to provide a base that surrounds the cleat 170 and allows a user to walk on a surface with minimal damage to the metal cleat 170. Additionally, the bracket 156 provides a contact surface on at least the lateral sides 172*a*, 172*b* of the cleat. These contact surface impact the "pull-out" motion and force required to remove the cleat and shoe from a pedal by moving a fulcrum point outboard of the pedal. The bracket 156 further comprises a supportive structure to hold the cleat 170 in place relative to the shoe. The bracket 156 comprises a recessed portion 174 within which the cleat is provided. A plurality of apertures 164 are also provided to allow a user with a plurality of options for fore-aft positioning of the system. At least one and preferably two retaining washers 176 are provided. The retaining washers 176 preferably comprise a spring steel, but may be comprised of various different materials. The retaining washers provide protection to the bracket and prevent or minimize fasteners from becoming bound in the cleat. Additionally, an interior or inboard portion of the retaining washers 176 contacts and/or extends over an outer edge of the cleat 170. When secured, the retaining washers 176 provide a compressive force to the cleat and help maintain the cleat's alignment and position relative to the shoe 152.

An additional mounting arrangement is provided wherein adjacent apertures 161 are provided. The adjacent apertures 161 are provided and operable for use with various known mountain-biking and gravel cycling shoes that comprise parallel slots with moveable female threaded portions provided therein. The adjacent apertures 161 are sized and operable to receive fasteners that extend through the cleat 170 and into the shoe.

Figure 16:
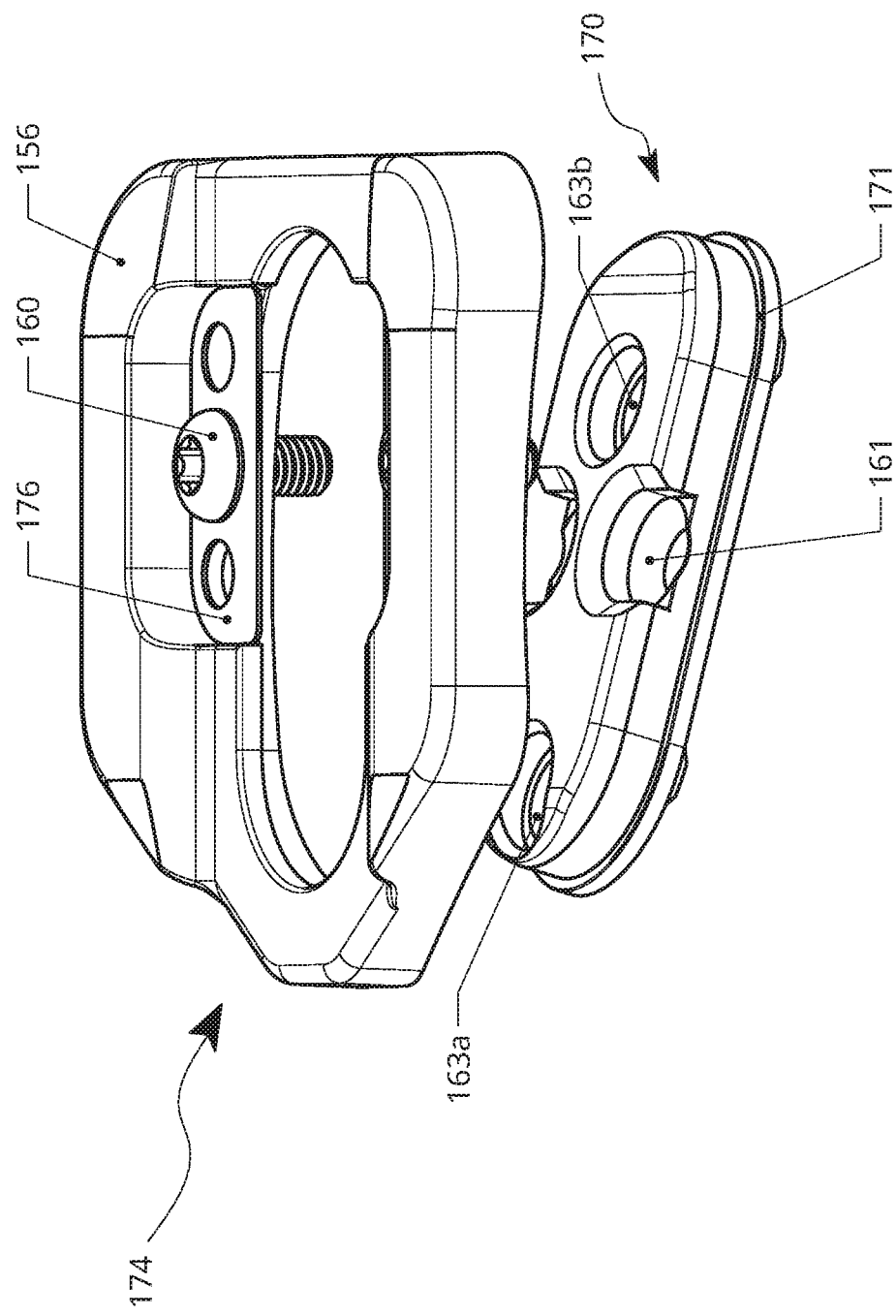
FIG. 16 is an exploded perspective view of a cleat according to one embodiment of the present disclosure.

As can be seen in at least FIG. 16, the cleat 170 comprises a lip or periphery 171 proximal to its base. The retaining washers 176 are preferably sized and operable to extend over and provide a down-force on the lip 171.

Figure 17:
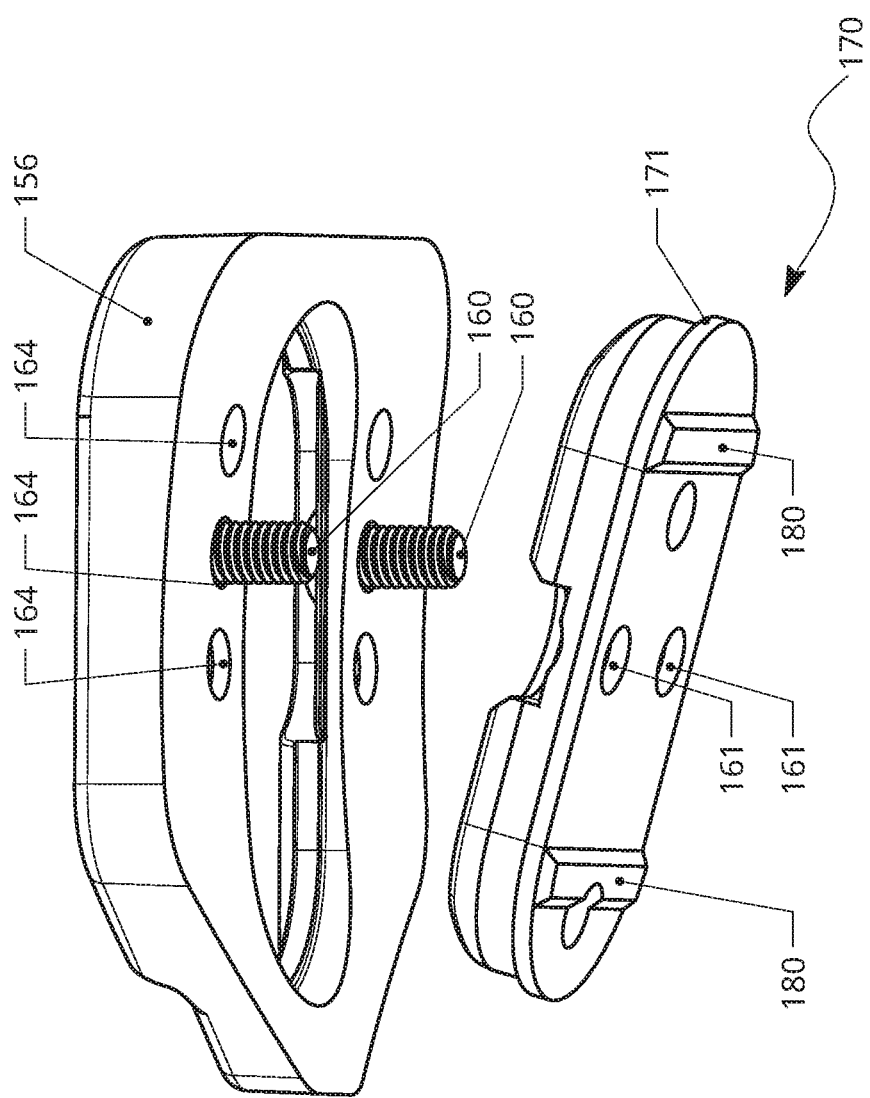
FIG. 17 is an exploded perspective view of a cleat according to one embodiment of the present disclosure.

FIG. 17 is an exploded bottom perspective view of a cleat according to the embodiments of FIGS. 14-16. As shown, the cleat 170 comprises protrusions 180 for enhancing grip and connection with a shoe sole. Additionally, the bracket or base member 156 comprises three pairs of apertures 164 that correspond to three different fore-aft positions in which the bracket 156 can be provided relative to the shoe sole.

Figure 18:
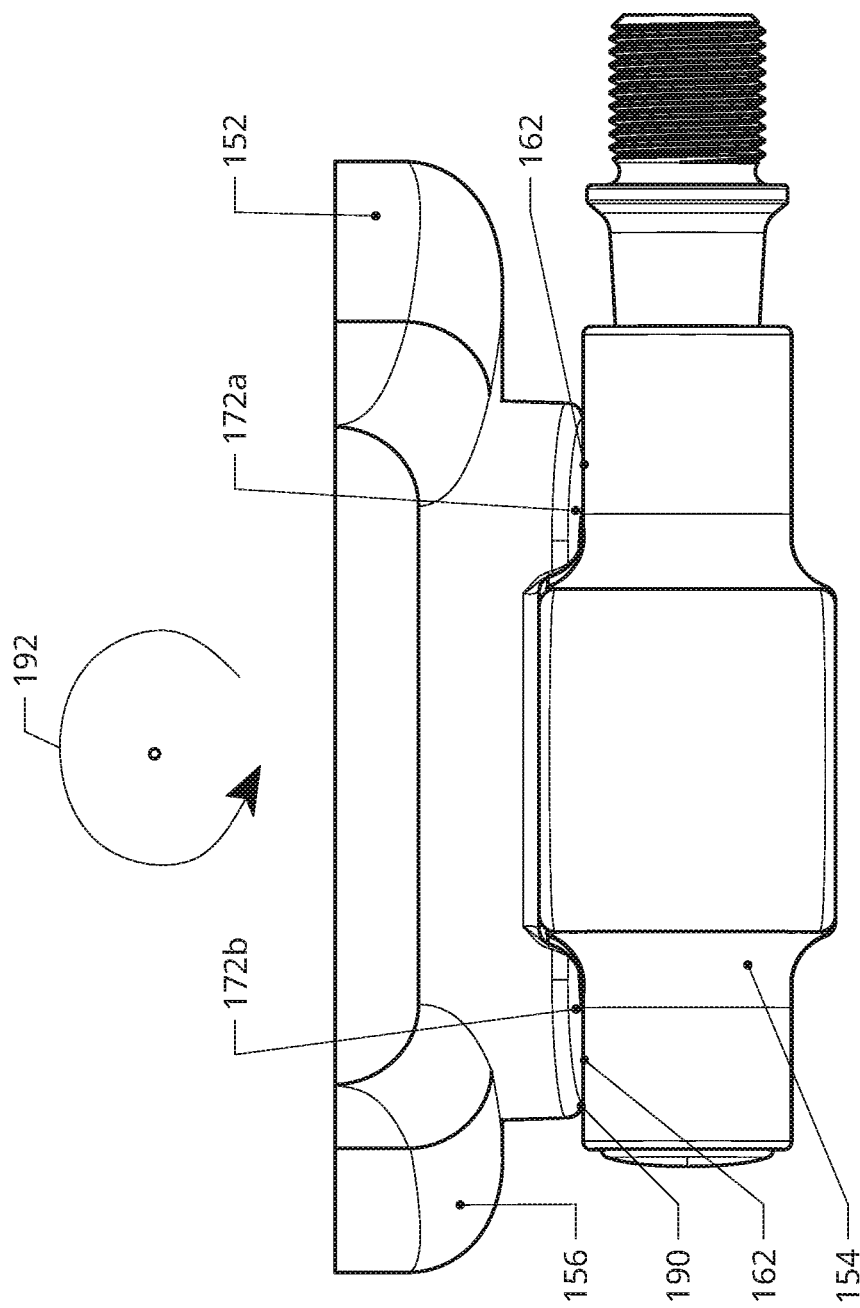
FIG. 18 is an elevation view of a pedal system according to one embodiment of the present disclosure.

FIG. 18 is an elevation view of a pedal system according to one embodiment of the present disclosure. As shown, a shoe sole 152 is provided with a cleat and bracket 156, and the shoe with the installed cleat and bracket are magnetically connected to a pedal 154 of the present disclosure. Various features of FIG. 18 have been shown and described with respect to FIGS. 13-17, for example, and that discussion is incorporated by reference. As shown in FIG. 18, contact surfaces 172*a*, 172*b* of the bracket 156 is provided in contact with lateral extensions 162 of the pedal. This contact creates a larger platform and more comfortable arrangement while riding. Additionally, this contact area provides for a fulcrum point 190 that is proximal to an exterior or outboard portion of the pedal 154 to increase the required removal force. In preferred systems and methods, a removal action or motion of the shoe and cleat from the pedal comprise rotating the shoe about a horizontal axis as indicated by 192 of FIG. 18. This motion concentrates a force on the fulcrum point 190 and allows for disconnection between the magnets of the pedal and the cleat. It is also contemplated that a removal action may comprise an inboard rotation (opposite of 192 in FIG. 18). However, as this motion would move a user's anatomy and footwear toward a bicycle and drivetrain components (for example), an outward or outboard rotation is preferred.

FIG. 19 is a perspective view of a pedal system according to one embodiment of the present disclosure. As shown, a shoe 152 is provided that is generally of the type and construction of a mountain-bicycling shoe. The sole of the shoe 152 comprises a built-in or pre-existing pocket or void 200 in which the cleat 170 is provided and secured. The cleat 170 is thus recessed within a pre-existing structure of the shoe sole 152. In this arrangement, the cleat 170 (which is preferably the same cleat as shown in FIGS. 13-18) and shoe 152 do not require a bracket 156. Rather, the structure and shape of the sole of the shoe 152 itself is operable to rest on and communicate with the lateral extensions 162 provided on the pedal. The fulcrum effect and contact points are functionally the same as that shown and described with respect to FIG. 18 (for example).

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

What is claimed is:

1. A clipless bicycle pedal system comprising:
    a pedal body rotatably interconnected to a spindle that is operable to be secured to a bicycle component;
    the pedal body comprising a pocket having an ovoid shape and a recessed area for selectively receiving at least one of a shoe and an attachment member provided on a shoe, and wherein the recessed area is provided at least partially within and recessed relative to a sidewall;
    wherein the sidewall comprises an angled sidewall extending above the recessed area by at least 0.10 inches;
    at least one magnet provided within the pedal body and at least partially surrounded by the sidewall, and wherein the at least one magnet is recessed relative to an upper portion of the sidewall and is provided flush with the recessed area;
    at least one lateral extension adjacent to the pocket and extending in a direction substantially parallel to the spindle, the lateral extension comprising a planar contact surface that is operable to be provided in contact with and receive a force from an article of footwear in communication with the pedal body.

2. The clipless bicycle pedal system of claim 1, wherein the pedal comprises first and second pockets on opposing sides of the pedal body.

3. The clipless bicycle pedal system of claim 1, wherein the sidewall extends above the recessed surface by at least approximately 0.125 inches.

4. The clipless bicycle pedal system of claim 1, further comprising an attachment member with a first side and a second side, the first side being operable to contact the pedal body and the second side being operable to be secured to an article of footwear.

5. The clipless bicycle pedal system of claim 4, wherein the attachment member comprises a ferrous material.

6. A clipless bicycle pedal system comprising:
a pedal body rotatably interconnected to a spindle that is operable to be secured to a bicycle component;
the pedal body comprising a pocket having a recessed area for selectively receiving at least one of a shoe and an attachment member provided on a shoe, and wherein the recessed area is recessed relative to and provided at least partially within a sidewall;
at least one magnet provided within the pedal body and at least partially surrounded by the sidewall, and wherein the magnet is recessed relative to an upper portion of the sidewall;
at least one lateral extension adjacent to the pocket and extending in a direction substantially parallel to the spindle;
an attachment member with a first side and a second side, the first side being operable to nest within and contact the pedal body and the second side being operable to be secured to an article of footwear; and
wherein the attachment member comprises a ferrous material.

7. The clipless bicycle pedal system of claim 6, wherein the pedal comprises first and second pockets on opposing sides of the pedal body.

8. The clipless bicycle pedal system of claim 6, wherein the sidewall comprises an angled sidewall.

9. The clipless bicycle pedal system of claim 6, wherein the at least one magnet is provided flush with the recessed area.

10. The clipless bicycle pedal system of claim 6, wherein the sidewall extends above the recessed surface by at least approximately 0.125 inches.

11. The clipless bicycle pedal system of claim 6, wherein the pocket comprises an ovoid shape.

12. A clipless bicycle pedal system comprising:
a rotatable body;
the rotatable body comprising a recessed area having an ovoid shape for selectively receiving at least one of a shoe and an attachment member provided on a shoe, and wherein the recessed area is provided at least partially within a sidewall;
at least one magnet provided within the rotatable body and at least partially surrounded by the sidewall, and wherein the magnet is recessed relative to an upper portion of the sidewall.

13. The clipless bicycle pedal system of claim 12, further comprising at least one lateral extension adjacent to the pocket, the lateral extension comprising a flush contact surface.

14. The clipless bicycle pedal system of claim 13, further comprising an attachment member comprising a non-ferrous material that is sized and operable to contact the flush contact surface of the lateral extension.

15. The clipless bicycle pedal system of claim 12, further comprising an attachment member operable to be secured to an article of footwear and selectively securable to the rotatable body.

* * * * *